United States Patent [19]

Malouf et al.

[11] Patent Number: 5,061,698

[45] Date of Patent: Oct. 29, 1991

[54] AQUEOUS BORON-CONTAINING COMPOSITIONS

[75] Inventors: George M. Malouf, Irvine; Edward L. Docks, Orange, both of Calif.

[73] Assignee: United States Borax & Chemical Corporation, Los Angeles, Calif.

[21] Appl. No.: 417,227

[22] Filed: Oct. 4, 1989

Related U.S. Application Data

[63] Continuation-in-part of Ser. No. 339,283, Apr. 17, 1989, which is a continuation-in-part of Ser. No. 155,775, Feb. 16, 1988, Pat. No. 4,844,725, which is a continuation-in-part of Ser. No. 69,906, Jul. 6, 1987, abandoned.

[51] Int. Cl.$^5$ ..................... A01N 55/08; A01N 59/14

[52] U.S. Cl. ........................................ 514/64; 424/659

[58] Field of Search ........................... 514/64; 424/659

[56] References Cited

U.S. PATENT DOCUMENTS 4,119,552 10/1978 Davis et al. .......................... 252/49.6

Primary Examiner—Allen J. Robinson
Attorney, Agent, or Firm—James R. Thornton

[57] ABSTRACT

Aqueous boron-containing compositions containing about 40 to 85% of the reaction product of boric acid and alkylamine in a mole ratio of from 1.5:1 to 3:1, about 2 to 15% of an alkanol or alkylene glycol and the balance water. The compositions are useful as liquid fertilizer compositions, corrosion inhibitors and as pesticides.

14 Claims, No Drawings

AQUEOUS BORON-CONTAINING COMPOSITIONS

This is a continuation-in-part of our copending application Ser. No. 339,283 filed Apr. 17, 1989, which is a continuation-in-part of our co-pending application Ser. No. 155,775 filed Feb. 16, 1988, now U.S. Pat. No. 4,844,725, which in turn is a continuation-in-part of our application, Ser. No. 69,906 filed July 6, 1987, now abandoned.

This invention relates to aqueous boron containing compositions, which are especially useful as liquid fertilizer compositions, as corrosion inhibitors for ferrous metals and as pesticides for preserving wood and controlling insects.

BACKGROUND OF THE INVENTION

Liquid compositions containing soluble boron have become increasingly popular in the last few years, primarily because of convenience of use in application to plants and soils and also for their ease in blending with other agricultural compositions, such as fertilizers and pesticides.

Boron is an essential micronutrient which is required by many crops and is therefore blended into many commercial fertilizer formulations, both liquid and granular. It may also be used in liquid form as a foliar spray, to be applied to boron deficient crops and absorbed through the leaves.

Previously, liquid boron compositions were usually prepared by merely dissolving an inorganic borate such as the sodium borates in water. However, the relatively low solubility of the sodium borates limits the amount of boron in the aqueous solution to less than about 3%.

Recently, workers in the plant food art have proposed various liquid compositions containing boron at a level which is generally somewhat higher than that obtained by merely dissolving sodium borates in water. For example, Ott U.S. Pat. No. 4,332,609, describes a liquid fertilizer composition containing a polyborate compound which is formed by reacting boric acid with an alkanolamine or aliphatic polyamine. These compositions have a substantially higher amount of boron, but tend to be inconvenient to prepare and are relatively expensive.

Similarly, Howard U.S. Pat. No. 4,572,733, describes preparation of a boron composition for agricultural application, which involves first forming a solution of a boron compound such as the sodium borates in a water-miscible glycol solvent, dispersing fine particles of a second boron compound in the glycol solution and then grinding or micronizing to form a flowable composition containing a fine slurry of the borate.

U.S. Pat. No. 4,155,739, to Downer et al., describes a boron containing spray oil for use as a foliar application. The boron can be present in several forms but is based on various types of borate esters. Amine-borate adducts are described but it is clear that these are adducts prepared by reaction of a triester of boric acid with a complex high molecular weight amine. The boron content in the spray oils is relatively low, generally in the rang of from 0.01 to 2% weight/volume.

Aqueous mixtures containing soluble boron have also been proposed for other uses such as, wood preservation and corrosion inhibition and in cutting fluids. For example, Gottsche et al. U.S. Pat. No. 4,461,721 describes a wood preservative which is an aqueous paste containing boric acid, organic amine and sodium polyborate. Sluhan U.S. Pat. No. 2,999,064 describes an aqueous cutting fluid composition containing a boric acid-alkanolamine reaction product which preferably also contains a long chain unsaturated fatty acid. Sluhan U.S. Pat. No. 3,186,946 and King U.S. Pat. No. 3,719,598 are also directed to cutting fluid compositions which contain amine borate salts in which the amines are complex alkanolamines or alkanoldiamines.

Vukasovich, *Lubrication Engineering*, Vol 36, 12, 708–712 (December 1980), and Vukasovich, 3rd International Colloquium, "Lubrication in Metal Working, Machining and Metal Forming Processes", Jan. 12–14, 1982, Technische Akademie Esslingen, Nellingen FDR, describes the effects of sodium molybdate in synthetic metal working fluids including "commercial amine borate-based" concentrates, which appear to be the alkanolamine borates of the Sluhan and King patents described above.

Canadian Patent 1082230, to Anger, describes polyborate solutions prepared by reacting alkanolamines or aliphatic polyamines with boric acid. These compositions are described as being useful as textile auxiliaries such as yarn moistening agents, as metal working agents and for liquid cleaners and disinfectants.

Davis et al. U.S. Pat. No. 4,119,552 discloses the use of alkylammonium borates as boronating agents for preparing complex boronated alkylphenoxy alkanoic acid amide lubricant additives.

Other patents of interest are German patent specification 21 40 051 to Gottsche which describes boric acid-amine compositions in water, as well as U.S. Pat. No. 2,492,562 which describes preparation of a sulfurization catalyst for fatty oils. The catalyst is prepared by heating a boro-ethylene glycol complex with a primary aliphatic amine containing at least 10 carbon atoms at an elevated temperature to give a catalyst which is a waxy-solid material.

See also U.S. Pat. No. 4,007,029 which describes liquid fertilizer compositions based on anhydrous ammonia solutions of a trace element, which may include boric acid.

Further, European Patent Specification 0 046 380, describes a liquid wood-treating composition, consisting of a solution of boric acid in ethylene glycol, which may optionally contain water.

SUMMARY OF THE INVENTION

This invention provides aqueous boron-containing solutions containing from about 7 to 13% boron, which comprise about 40 to about 85% of the reaction product of boric acid with at least one alkylamine in a mole ratio of from 1.5:1 to about 3:1, about 2% to about 15% of an alcohol which is selected from the lower alkanols and lower alkylene glycols, and the balance water.

DESCRIPTION OF THE INVENTION

The lower alkanols and alkylene glycols have from 1 to about 6 carbon atoms. Examples of suitable lower alkanols and alkylene glycols include methanol, ethanol, n-propanol, isopropanol, D-butanol, ethylene glycol, butylene glycol, propylene glycol, hexylene glycol and the like. The alkylamines also contain a lower alkyl group having from 1 to about 6 carbon atoms. The monoalkylamines are preferred since most compositions based on dialkyl and trialkyl amines are relatively unstable at higher boron levels. Typical alkylamines include methylamine, ethylamine, D-propylamine, butylamine, n-amylamine, n-hexylamine, cyclohexylamine, and the like.

The compositions of this invention are readily prepared by mixing the amine, water and alkanol or alkylene glycol in a covered vessel and slowly adding the appropriate amount of boric acid. The mixture is then stirred until all the boric acid is dissolved, generally about 1 to 2 hours. The amine may be dissolved in water prior to addition or added as a gas. Heating is usually not required, although in some cases, it may be advisable in order to accelerate dissolving of the boric acid. However, if heating is employed, it generally is at a temperature of not more than about 60° C.

In preferred compositions according to this invention, the aqueous solution contains about 60 to about 70% of the alkylamine-boric acid salt, about 4 to 12% of the alkanol or alkylene glycol and about 17 to 26% water. Monomethylamine is the most preferred alkyl amine and ethylene glycol is the most preferred alkylene glycol.

The compositions of the invention are miscible with water in all proportions. They are also miscible with some alcohols, such as methanol and ethanol, but are only slightly soluble in organic solvents such as toluene, xylene and mineral spirits.

The following examples illustrate preparation of representative compositions of this invention.

EXAMPLES 1-6

Aqueous amine borate compositions were prepared by mixing the appropriate amine (dissolved in water) and alkanol or glycol in a stirred covered vessel and slowly adding the indicated amount of boric acid. The resultant mixture is then stirred at room temperature until all the boric acid has dissolved (about 1-2 hours). Amounts are percentage by weight.

| Example | Amine | Amt. | Alkanol or Glycol | Amt. | Boric Acid (Amt.) | Water (Amt.) | W/W % B |
|---|---|---|---|---|---|---|---|
| 1 | methyl | 11.8 | ethylene G | 6.3 | 58.0 | 23.9 | 10 |
| 2 | methyl | 11.8 | ethylene G | 4.2 | 58.0 | 26.0 | 10 |
| 3 | methyl | 13.4 | ethylene G | 8.4 | 58.0 | 20.2 | 10 |
| 4 | methyl | 12.6 | ethylene G | 10.5 | 58.0 | 18.9 | 10 |
| 5 | ethyl | 33.6 | propylene G | 12.0 | 40.0 | 14.4 | 7 |
| 6 | methyl | 13.4 | butylene G | 8.4 | 58.0 | 20.2 | 10 |
| 7 | methyl | 13.4 | MeOH | 8.4 | 58.0 | 20.2 | 10 |
| 8 | methyl | 12.6 | MeOH | 10.5 | 58.0 | 18.9 | 10 |
| 9 | methyl | 9.0 | ethylene G | 6.0 | 40.0 | 45.0 | 7 |
| 10 | ethyl | 17.6 | EtOH | 6.3 | 68.6 | 7.5 | 12 |
| 11 | ethyl | 23.5 | EtOH | 8.4 | 58.0 | 10.1 | 10 |
| 12 | isopropyl | 23.6 | ethylene G | 8.4 | 58.0 | 10.0 | 10 |
| 13 | n-butyl | 30.0 | ethylene G | 10.0 | 40.0 | 20.0 | 7 |
| 14 | n-hexyl | 24.3 | propylene G | 8.0 | 51.7 | 16.0 | 9 |
| 15* | cyclohexyl | 21.5 | hexylene G | 7.1 | 57.2 | 14.2 | 10 |
| 16 | n-butyl | 27.2 | hexylene G | 9.0 | 45.8 | 18.0 | 8 | ethylene G = ethylene glycol
propylene G = propylene glycol
butylene G = butylene glycol
MeOH = methanol
EtOH = ethanol
hexylene G = hexylene glycol
*heated to about 60° C.

The formulations may be applied as foliar sprays to trees, crops and to soil in undiluted form or they may be diluted such as with water. The undiluted form contains a high level of available boron. For example, Examples 1, 3 and 10 contain 1.08, 1.08 and 1.3 pound, respectively, of boron per gallon. The normal application rate to crops and trees is generally in the range of about 0.5 to 4 pounds of B per acre, depending on the requirements of the crop species. Typical crops to which boron is applied are peanuts, cotton, alfalfa, apples, sugar beets, corn, and many vegetables. In tests on representative crops, the compositions of this invention have been found to be non-phytotoxic at normal application rates.

When used as a source of boron for mixed fertilizer formulations, the compositions of this invention are added to a liquid or qranular formulation in an amount sufficient to provide about 0.5 to about 2% B These may be subsequently diluted with water by the user for application to crops and soils. The compositions may also be diluted with pesticides such as insecticides, especially for foliar application.

The aqueous borate compositions of this invention also have utility as corrosion inhibitors, such as additives for machining fluids, to prevent corrosion of ferrous metals. They can also be used as wood preservatives, being taken up rapidly by sawn lumber and logs whether green or dry. The resultant treated wood is resistant to insect and fungal attack. When used as corrosion inhibitors, they are generally in diluted form, such as at a concentration to give about 0.2% to 1.0% boron. When used as wood preservatives, they may be used in the undiluted, concentrated form or diluted, such as with water.

Insects, such as termites, may also be controlle by application of the compositions to infested wood or soil. Generally, diluted compositions, such as with water, are used for such applications.

The following examples illustrate use of the compositions of this invention as wood preservatives.

EXAMPLE 17

The composition of Example 3, above, was tested as a wood preservative to prevent fungal decay, using the procedure of American Wood Preservers' Association Standard M10-77. The composition was diluted with water to give concentrations of 0.26, 0.52 and 1.05% of Composition 3. Ten 0.75 inch cubes of ponderosa pine were impregnated with each diluted composition, conditioned and exposed to G. trabeum test fungi according to the procedure of AWPA Standard M10-77. Ten untreated controls were also included in the test. Three months after exposure, the cubes were examined for weight loss to determine the amount of decay by the fungus. The average weight loss of each group of 10 cubes was recorded The results were as follows:

| Solution Concentration (%) | Boron Conc. in Wood (ppm.) | Ave. Wt. Loss (%) |
|---|---|---|
| 0.26 | 460 | 1.8 |
| 0.52 | 860 | 1.8 |
| 1.05 | 1600 | 3.5 |
| Untreated Control | | 54.6 |

EXAMPLE 18

The composition of Example 3, above, was tested to determine its effect on subterranean termites. Western subterranean termites, *Reticulitermes hesprus*, were permitted to tunnel in soils treated with three concentrations of Example 3. Disodium octaborate tetrahydrate, an inorganic borate was also included in the test. Treated soils were packed into glass tubes on top of untreated soil so that termites were able to tunnel and avoid treated layers of soil.

Infested tree stumps from Riverside, California were split into small pieces and termites gently extracted by tapping the wood. The dislodged termites were collected on dry paper toweling and placed in plastic boxes (ca. 30 by 15 by 10 cm). Water was provided ad libitum from a shell vial stoppered with a cotton plug. This water system helped prevent the accumulation of excess moisture and growth of bacteria and mites. The boxes were sealed with plastic wrap and covered with a plastic top to prevent moisture loss and escape of termites. The boxes were stored at room conditions, 25°±2° C. and ca. 50% RH. The insects were held for one week to allow for any mortality incurred during the extraction process. The live undifferentiated pseudergates ("workers," ca. 5 mm long) were used in the test Soil primarily consisting of particles of decomposed granite was collected from the Santa Ana River bed in Colton, California. The soil was washed with tap water to remove most of the large pieces of organic matter and then steamed for about on hour to kill any fungal spores. The sterilized moist soil was placed on large open trays and dried overnight in a hot-air oven. The dry soil was then passed through a series of sieve screens leaving soil particles ranging from 0.15 to 0.84 mm (U.S. mesh 20-100). To evenly treat the soil, 250 g aliquots of soil were evenly spread <1 mm thick over a 50 by 30 cm metal tray. Aliquots of 13 ml of the treating composition (diluted with water) were sprayed at 1970 g/cm$^2$ (28 psi) with an air-brush (Wren, model B, Binks Manufacturing Company, Chicago) to provide concentrations in the soil of 1000, 500, and 250 ppm. The treated soils were dried in a fume hood for 30 min and stored in sealed 0.9-liter glass jars.

Distances tunneled and mortality were observed fo termites put into sections of glass tubing (9 mm inside diameter by 15 cm tall) and allowed to tunnel from untreated soil into treated soil. The diameter of the glass tubing made it easy to detect the distance tunneled by termites in these soil-filled tubes. Tubes were filled with treated and untreated soil leaving 1.8 cm of tubing unfilled at the top and bottom of the 15 cm section. A piece of cotton (1.8 cm long) was plugged into the bottom end of each tube. A 3.9 cm layer of untreated soil was gently packed in the tube followed by a 7.5 cm layer of treated soil. A line was marked around the glass tube where the untreated and treated soil met. The controls were filled with 11.4 cm of untreated soil. The tubes were inverted and 1.5 ml aliquots of water were added to the untreated soil and drawn through the treated section with an air vacuum to uniformly moisten the soil, facilitate terminte tunneling, and provide a moisture source. This technique allowed the soil to be moistened and minimized contamination of the untreated portion.

Twenty worker termites were introduced in the bottom of each filled tube (3.9 cm of untreated soil) along with a piece of paper toweling, which acted as a food source, and the tubes were stoppered to prevent termite escape. The tubes were arranged vertically with the treated soil zone on top. The distance tunneled by the termites was recorded periodically and the time at which the termites were removed from the tubes and the number of dead insects was counted. The remaining live insects from each tube were placed in a 35 to 10 mm plastic petri dish, along with a moistened paper towel pad which served as a food and water source. The termites were held in a chamber maintained at 93% RH. Mortality was recorded at 7 days after exposure. Each treatment and controls were replicated five times.

Table A shows the results of tunneling experiments of termites exposed to treated and untreated soils.

TABLE A

| Treatment | concn* | X (±SD) distance (cm) at hour$^a$ | | | |
|---|---|---|---|---|---|
| | | 12 | 48 | 100 | 140 |
| Sodium octaborate tetrahydrate | 1000 | 1.6 ± 0.9a | 1.7 ± 1.0a | 3.1 ± 2.3b | 3.3 ± 2.6bc |
| | 500 | 1.5 ± 0.4a | 1.8 ± 0.7a | 3.3 ± 1.2bc | 3.3 ± 1.2bc |
| | 250 | 1.9 ± 0.5a | 2.0 ± 0.6a | 3.6 ± 0.7bc | 4.1 ± 0.6bc |
| Example 3 | 1000 | 2.5 ± 0.7a | 2.8 ± 1.1a | 4.7 ± 0.7ab | 5.0 ± 0.4ab |
| | 500 | 1.9 ± 0.7a | 2.0 ± 0.6a | 2.1 ± 0.5c | 2.3 ± 0.6c |
| | 250 | 2.7 ± 1.0a | 3.0 ± 1.1a | 7.6 ± 2.5a | 8.7 ± 2.7a |
| Control | | 2.1 ± 1.0a | 2.3 ± 1.0a | 6.9 ± 4.0a | 8.8 ± 3.0a |

$^a$Values followed by the same letters are not significantly different at $P < 0.05$ (Duncan's New Multiple Range test).
*ppm. boron in soil At the termination of the tunneling study (14 days), the percentage of termites dead or moribund from tubes with treated soils ranged from 25-83%. The results are presented in Table B.

Various modifications and changes of the invention can be made and, to the extent that such variations incorporate the spirit of this invention, they are intended to be included within the scope of the appended claims.

TABLE B

| | | Treated Soil | | % Dead at day$^a$ | |
|---|---|---|---|---|---|
| Treatment | concn.* | % Tubes with tunnels | Avg. length (cm.) | 14 | 21 |
| Sodium octaborate tetrahydrate | 1000 | 40 | 2.5 | 72 | 68bc |
| | 500 | 60 | 0.4 | 51 | 88ab |
| | 250 | 80 | 0.4 | 29 | 50c |
| Example 3 | 1000 | 100 | 1.1 | 25 | 96a |
| | 500 | 0 | 0.0 | 83 | 92ab |
| | 250 | 100 | 4.6 | 26 | 60c |
| Control | — | — | — | 8 | 23d |

$^a$Values followed by the same letters are not significantly different at $P < 0.05$ (Duncan's New Multiple Range test).
*ppm boron in soil

What is claimed is:

1. The method of controlling insects and fungi which comprises application to said insects or fungi an effective amount of an alkylammonium borate composition containing about 7% to 13% boron comprising about 40% to about 85% of the reaction product of boric acid and lower alkylamine in a mole ratio of from 1.5:1 to about 3:1, about 2% to about 15% of an alcohol selected from the group consisting of lower alkanols and lower alkylene glycols, and the balance water.

2. The method according to claim 1 in which said alkylamine is a monoalkylamine.

3. The method according to claim 1 in which said alcohol is an alkylene glycol.

4. The method according to claim 1 in which said alkylamine is methylamine.

5. The method according to claim 1 in which said alkylammonium borate composition comprises about 60 to about 70% of said reaction product of boric acid and alkylamine, about 4 to 12% of said alcohol and about 17 to 26% water.

6. The method according to claim 5 in which said alkylamine is methylamine and said alcohol is ethylene glycol.

7. The method according to claim 1 in which said alcohol is ethylene glycol.

8. The method according to claim 1 in which said alkylamine is ethylamine and said alcohol is ethanol.

9. The method according to claim 1 in which said alkylammonium borate composition comprises about 13 percent methyl amine, 8 percent ethylene glycol, 58 percent boric acid and the balance water, said percentages by weight.

10. The method of controlling insects which comprises application of an effective amount of an aqueous solution comprising the composition of claim 9 to soil infested with said insects.

11. The method according to claim 1 in which said application is to soil.

12. The method according to claim 1 in which said application is to wood.

13. The method of preserving wood which comprises impregnating said wood with an effective amount of an aqueous solution of alkylammonium borate containing about 7% to 13% boron comprising about 40% to about 85% of the reaction product of boric acid and lower alkylamine in a mole ratio of from 1.5:1 to about 3:1, about 2% to about 15% of an alcohol selected from the group consisting of lower alkanols and lower alkylene glycols, and the balance water.

14. The method according to claim 12 in which said alkylammonium borate composition comprises about 13 percent methyl amine, 8 percent ethylene glycol, 58 percent boric acid and the balance water, said percentages by weight.

* * * * *